US009335757B2

(12) United States Patent
Kudou et al.

(10) Patent No.: US 9,335,757 B2
(45) Date of Patent: May 10, 2016

(54) NUMERICAL CONTROLLER WITH AUXILIARY COMMAND EXECUTION FUNCTION

(71) Applicant: FANUC Corporation, Minamitsuru-gun, Yamanashi (JP)

(72) Inventors: Takehiro Kudou, Yamanashi (JP); Kaoru Hiraga, Yamanashi (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 691 days.

(21) Appl. No.: 13/736,982

(22) Filed: Jan. 9, 2013

(65) Prior Publication Data

US 2013/0178974 A1 Jul. 11, 2013

(30) Foreign Application Priority Data

Jan. 11, 2012 (JP) ................................ 2012-003165

(51) Int. Cl.
*G05B 19/4063* (2006.01)
*G05B 19/4155* (2006.01)

(52) U.S. Cl.
CPC ........ *G05B 19/4063* (2013.01); *G05B 19/4155* (2013.01); *G05B 2219/34391* (2013.01); *G05B 2219/35243* (2013.01)

(58) Field of Classification Search
CPC ........... G05B 19/4063; G05B 19/4155; G05B 2219/34391; G05B 2219/35243
See application file for complete search history.

(56) References Cited

U.S. PATENT DOCUMENTS 4,163,183 A * 7/1979 Engelberger .......... B23P 21/002 318/568.13
4,633,385 A * 12/1986 Murata ............ G05B 19/41815 700/86

(Continued)

FOREIGN PATENT DOCUMENTS

JP 62-189506 A 8/1987
JP H02-259909 A 10/1990

(Continued)

*Primary Examiner* — Ramesh Patel
(74) *Attorney, Agent, or Firm* — Drinker Biddle & Reath LLP

(57) ABSTRACT

When a program command read from a machining program is an auxiliary command, a command associated with the auxiliary command is transmitted. Monitoring of reception of a completion signal corresponding to the command is started. When the completion signal is not received, and when the auxiliary command is a command indicating the unnecessity of waiting to receive the completion signal, determination is made as to whether or not a condition for ending the monitoring of the completion signal corresponding to the auxiliary command is satisfied without receiving the completion signal. When the condition is satisfied, an error process is executed to end the execution of the machining program.

10 Claims, 6 Drawing Sheets

START
SA100 READ PROGRAM COMMAND
SA101 READ PROGRAM COMMAND IS AUXILIARY COMMAND? YES / NO
SA102 TRANSMIT SIGNAL CORRESPONDING TO AUXILIARY COMMAND
SA103 START MONITORING COMPLETION SIGNAL
SA104 COMPLETION SIGNAL IS RECEIVED? YES / NO
SA105 READ PROGRAM COMMAND IS AUXILIARY COMMAND INDICATING UNNECESSITY OF WAITING TO RECEIVE COMPLETION SIGNAL? YES / NO
SA108 MONITORING OF COMPLETION SIGNAL IS CONTINUED? YES / NO
SA106 CONDITION FOR ENDING MONITORING OF COMPLETION SIGNAL IS SATISFIED? YES / NO
SA107 ERROR PROCESS
SA109 END MACHINING PROGRAM? YES / NO
END

(56) References Cited

U.S. PATENT DOCUMENTS 4,982,335 A * 1/1991 Isobe .................. G05B 19/408 700/159
5,251,143 A * 10/1993 Maeda .............. G05B 19/4068 700/172
5,253,178 A * 10/1993 Nakayama ............... B23H 7/02 219/69.12
5,355,062 A * 10/1994 Takizawa ............... B65G 43/08 318/568.1
5,793,635 A * 8/1998 Niwa .................. G05B 19/406 318/570
5,822,212 A * 10/1998 Tanaka .............. G05B 19/4063 700/174
5,963,451 A * 10/1999 Seki .................. G05B 19/4097 700/160
6,574,589 B1 * 6/2003 Shoyama .............. G06F 3/0614 360/48
6,591,148 B1 * 7/2003 Masuda ............... G05B 19/184 409/274
2002/0148961 A1 * 10/2002 Nakasuji .............. G01N 23/225 250/311
2005/0209712 A1 * 9/2005 Sagasaki ............ G05B 19/4093 700/28
2006/0239386 A1 * 10/2006 Endo .................... G05B 19/414 375/343
2011/0107309 A1 * 5/2011 Baron ....................... G06F 8/33 717/128

FOREIGN PATENT DOCUMENTS

JP 2007-310499 A 11/2007
JP 4558675 B 10/2010
JP 2011-039701 A 2/2011

* cited by examiner

11
MACHINING PROGRAM STORAGE UNIT
12
READER
13
AUXILIARY COMMAND STORAGE UNIT
17
DETERMINATION PART
14
AUXILIARY COMMAND TRANSMITTER
15
COMPLETION SIGNAL RECEIVER
16
COMPLETION SIGNAL MONITORING PART
18
S11
S21
EXTERNAL DEVICE
19

NUMERICAL CONTROLLER WITH AUXILIARY COMMAND EXECUTION FUNCTION

RELATED APPLICATION DATA

This application claims priority under 35 U.S.C. §119 and/or §365 to Japanese Application No. 2012-003165 filed Jan. 11, 2012, the entire contents of which are incorporated herein by reference.

BACKGROUND OF THE INVENTION

1. Field of the Invention

The present invention relates to a numerical controller with an auxiliary command execution function.

2. Description of the Related Art

A machining program consists of an axis movement command for operating an axis and an auxiliary command other than the axis movement command. A numerical controller reads the auxiliary command from the machining program and then transmits a command associated with the auxiliary command. The numerical controller then receives a completion signal associated with the command and thereby executes a subsequent command. This means that the numerical controller needs to wait for the subsequent command before receiving the completion signal, causing the machining program to take longer to execute the commands.

On the contrary, there has been known a technology that previously registers auxiliary commands indicating the unnecessity of receiving completion signals associated thereto and, when active commands are these auxiliary commands indicating the unnecessity of receiving completion signals associated thereto, sequentially executes subsequent commands without waiting to receive the completion signals. Several related prior arts are described next.

(First Example of Prior Art)

Japanese Patent Application Laid-Open No. 62-189506 discloses a numerical controller of a machine tool for controlling an external device. This numerical controller reads a machining program, determines the presence of a M-function in the program by using a determination circuit, outputs a M-function signal to the external device, and receives a M-function completion signal from the external device. This numerical controller further stores in a nonvolatile memory a M-function number requiring no M-function completion signal, compares a M-function number requiring no M-function completion signal with the M-function number stored in the nonvolatile memory, and advances to a subsequent machining program without the M-function completion signal.

A brief summary of outputting the M-function signal in the abovementioned numerical controller 21 is now described using FIG. 3.

A machining program storage unit 22 stores a large number of machining programs required to perform machining, the machining programs being stored therein in advance by an operator. A reader 23 reads the machining programs stored in the machining program storage unit 22 and sequentially executes program commands. A determination part 24 determines whether commands in the machining programs read by the reader 23 are auxiliary commands or not. When the determination part 24 confirms the presence of auxiliary commands in the machining programs, an auxiliary command transmitter 25 transmits signals requiring the execution of auxiliary functions associated with the auxiliary commands. A completion signal receiver 26 receives completion signals indicating the completion of the execution of the auxiliary functions (but does not execute subsequent commands before receiving the completion signals).

A process in which the auxiliary commands are executed by the numerical controller 21 is now described using a flowchart shown in FIG. 4.

The program commands in the machining programs are read (step SB01), and it is determined whether the read program commands are the auxiliary commands or not (step SB02). When the read program commands are the auxiliary commands, signals requiring the execution of auxiliary functions associated with the auxiliary commands are transmitted (step SB03). After the execution of the auxiliary functions, it is determined whether completion signals indicating the completion of the auxiliary functions are received or not (step SB04). When the completion signals are received, then it is determined whether the machining programs are ended or not (step SB05). When the machining programs are not yet ended, step SB01 is performed again to read the program commands.

(Second Example of Prior Art)

The numerical controller disclosed in Japanese Patent Application Laid-Open No. 2007-310499 has a machining program analysis processing part for analyzing a machining program and causing a ladder processing part to execute a predetermined command of the program, the ladder processing part for executing a ladder sequence corresponding to a command from the machining program analysis processing part, and a mechanical control processing part for performing predetermined control on a control target connected to the numerical controller, based on an analysis result on the machining program that is obtained from the machining program analysis processing part and a ladder sequence execution result obtained from the ladder processing part.

The ladder processing part has a temporary process end signal output function that, once receiving from the machining program analysis processing part a M code that gives a command to perform an auxiliary process for performing machining, transmits a temporary process end signal indicating that the processing of the received M code has ended in a pseudo manner, and a primary process end signal output function that transmits a primary process end signal indicating that the processing of the received M code has actually ended.

Once receiving the temporary process end signal from the ladder processing part, the machining program analysis processing part proceeds to a subsequent block before reading a M code process completion waiting command for receiving the primary process end signal on the M code of the machining program, and does not execute the processing on the subsequent block until the primary process end signal is received, when the primary process end signal is not received before the M code process completion waiting command is read.

(Third Example of Prior Art)

The numerical controller disclosed in Japanese Patent Application Laid-Open No. 2011-39701 has a machining program storage unit, an auxiliary command completion waiting table storage unit, a machining program execution part, a completion signal receiver, a completion waiting determination part, and a command execution part.

The machining program storage unit is for storing a machining program in which is described a command that includes a movement command as a command for axially moving a tool of a machine tool and an auxiliary command as a command for assisting the axial movement. The auxiliary command completion waiting table storage unit is for storing an auxiliary command completion waiting table having an association between the auxiliary command and a completion waiting condition obtained by defining information on the auxiliary command as a condition for waiting to receive an operation completion signal corresponding to the auxiliary command from the machine tool. The machining program execution unit executes the command in an order described in the machining program stored in the machining program storage unit, by accepting an execution request of the machining program. The completion signal receiver receives the operation completion signal. The completion waiting determination part detects the command from the machining program to be executed. When the auxiliary command is detected as the command, the completion waiting determination part determines whether a result of execution based on a command subsequent to the detected auxiliary command conforms to the completion waiting condition corresponding to the detected auxiliary command, the condition being stored in the auxiliary command completion waiting table. When the execution result does not conform to the completion waiting condition corresponding to the auxiliary command requesting the execution, the command execution part requests to execute subsequent commands sequentially in the machining program. When the execution result conforms to the completion waiting condition corresponding to the auxiliary command requesting the execution, the command execution part waits to receive the operation completion signal without requesting to execute subsequent commands sequentially in the machining program.

A brief summary of the abovementioned numerical controller 21 is described using FIG. 5.

The numerical controller 21 controls an external device 19. A large number of machining programs required to perform machining are stored in the machining program storage unit 22 in advance by an operator. Auxiliary commands indicating the unnecessity of waiting to receive completion signals (indicating the unnecessity of receiving completion signals) and conditions for ending the monitoring of the completion signal, are stored in an auxiliary command storage unit 27 in advance by the operator. The reader 23 reads the machining programs stored in the machining program storage unit 22 and sequentially executes program commands. The determination part 24 determines the auxiliary commands in the machining programs read by the reader 23 (determines whether or not the read program commands are the auxiliary commands indicating the unnecessity of receiving completion signals, which are stored in the auxiliary command storage unit 27). When the determination part 24 confirms the presence of the auxiliary commands in the machining programs, the auxiliary command transmitter 25 transmits signals requesting to execute auxiliary functions corresponding to the auxiliary commands. The completion signal receiver 26 receives the completion signals indicating the completion of the execution of the auxiliary functions.

When the determination part 24 determines that the program commands read by the reader 23 are the auxiliary commands, the auxiliary command transmitter 25 transmits signals requesting to execute the corresponding auxiliary functions. The completion signal receiver 26 executes the subsequent command without waiting to receive the completion signal, when the determination part 24 determines that the program commands read by the reader 23 are the auxiliary commands indicating the unnecessity of receiving the completion signals.

A process in which the auxiliary commands are executed by the numerical controller 21 is now described using a flowchart shown in FIG. 6.

The program commands in the machining programs are read (step SC01). It is determined whether the read program commands are the auxiliary commands or not (step S02). When the read program commands are the auxiliary commands, signals requesting to execute the auxiliary functions corresponding to the auxiliary commands are transmitted (step SC03). It is determined whether the completion signals are received or not (step S04). When the completion signals are received, the subsequent commands are executed. When the completion signals are not received, it is determined whether or not the read program commands are the auxiliary commands indicating the unnecessity of receiving the completion signals (step SC05). When the read program commands are the auxiliary commands indicating the unnecessity or receiving the completion signals, the subsequent commands are executed until the end of the machining programs without waiting to receive the completion signals (step SC06). The program execution time can be reduced by sequentially executing the subsequent commands without waiting to receive the completion signals.

The first, second, and third examples of prior art described above cannot confirm whether the auxiliary commands indicating the unnecessity of receiving the pre-registered completion signals are ended successfully or not. Therefore, when the auxiliary functions that have an impact on the machining are not ended successfully, the machining is continued without supply of machining fluid in, for example, the auxiliary functions in which the machining fluid needs to be supplied. As a result, defects are generated in the machined products. Consequently, the machining has to be started all over again, lowering the machining efficiency.

SUMMARY OF THE INVENTION

The present invention was contrived in view of the problems of the prior arts described above. An object of the present invention, therefore, is to provide a numerical controller, which, in an auxiliary command of a machining program, starts monitoring a completion signal after execution of the auxiliary command is started, continues to monitor the completion signal while sequentially executing subsequent commands, and ends the monitoring of the completion signal when the completion signal is received before a predetermined condition is established.

A numerical controller according to the present invention is a numerical controller which, when reading a program command from a machining program, determines whether the read program command is an auxiliary command or not, transmits a signal requesting to execute an auxiliary function associated with the auxiliary command when the read program command is the auxiliary command, and executes a subsequent command by receiving a signal indicating the completion of the auxiliary command. This numerical controller has a storage unit for storing an auxiliary command indicating unnecessity of waiting to receive a completion signal corresponding to an auxiliary command, and a condition for ending monitoring of the completion signal corresponding to the auxiliary command. After starting the execution of the auxiliary command indicating the unnecessity of waiting to receive the completion signal, monitoring of the completion signal corresponding to the auxiliary command is started and the monitoring of the completion signal is continued while subsequent commands are sequentially executed. When the completion signal is received before the condition for ending monitoring of the completion signal, stored in the storage unit, is satisfied, the monitoring of the completion signal is ended.

The condition for ending monitoring of the completion signal, which is stored in the storage unit, may be the number of execution blocks obtained after the execution of the auxiliary command stored in the storage unit is started, the length of time elapsed since the start of the execution of the auxiliary command stored in the storage unit, a movement distance obtained after the start of the execution of the auxiliary command stored in the storage unit, or a machining position obtained after the start of the execution of the auxiliary command stored in the storage unit.

When the completion signal corresponding to the auxiliary command is not received from when the execution of the auxiliary command stored in the storage unit is started until when the condition for ending monitoring of the completion signal is satisfied, the execution of the machining program is stopped to issue an alarm.

The present invention can provide a numerical controller having an auxiliary command execution function, which can execute a subsequent command without waiting to receive the completion signal and receive the completion signal. The numerical controller, therefore, can determine whether the auxiliary function is ended successfully or not, and even when the auxiliary function is not ended successfully, the numerical controller of the present invention deals with such a situation by stopping the current machining or executing any other relevant processing.

BRIEF DESCRIPTION OF THE DRAWINGS

The above and other objects and features of the present invention will become more apparent from the following detailed description with reference to the following accompanying drawings.

DESCRIPTION OF THE PREFERRED EMBODIMENTS

Figure 1:
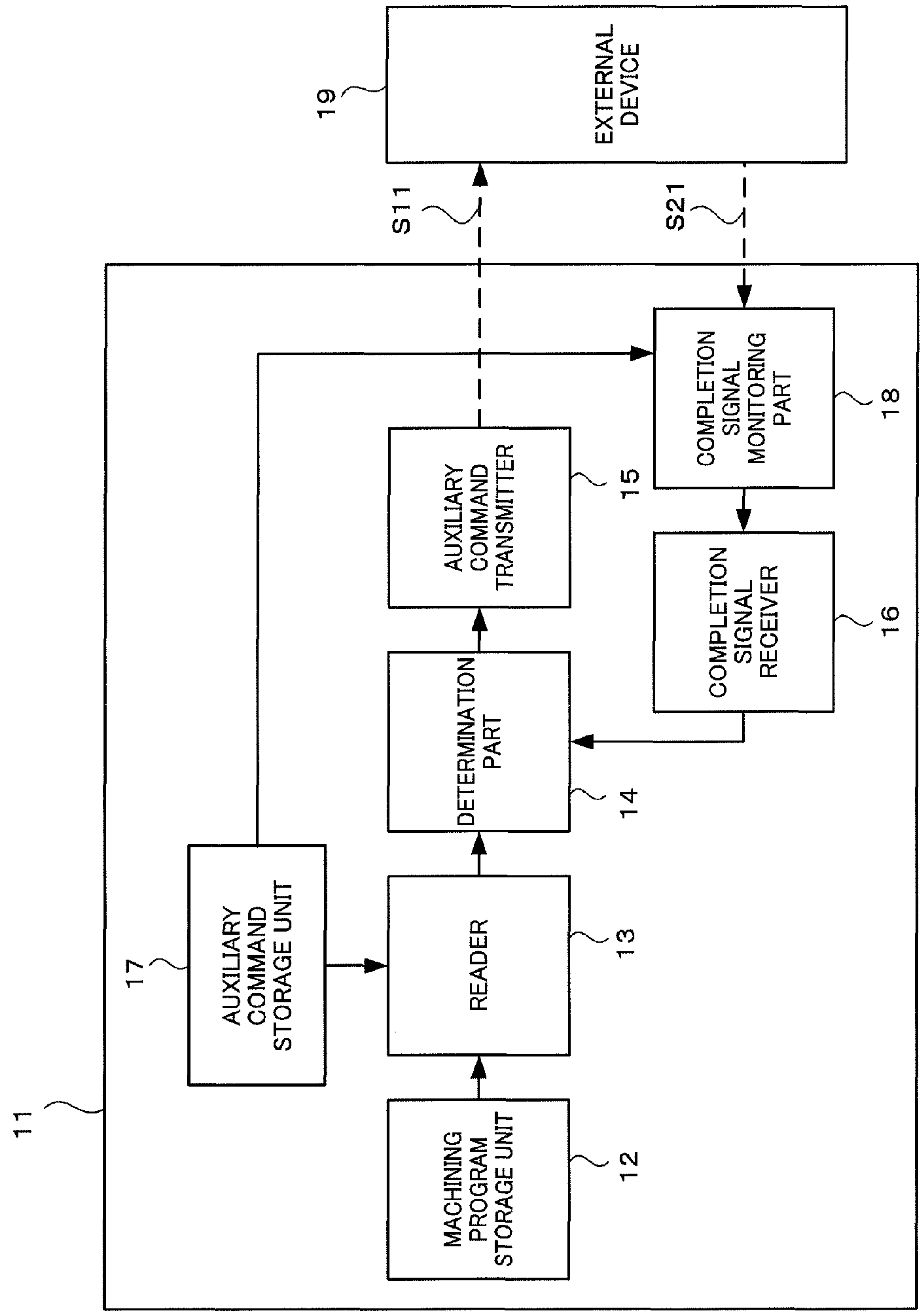
FIG. 1 is a block diagram illustrating a numerical controller according to the present invention.

A numerical controller according to the present invention is described with reference the block diagram shown in FIG. 1.

A numerical controller 11 is a device for controlling an external device 19. A machining program storage unit 12 stores a large number of machining programs required to perform machining. An auxiliary command storage unit 17 stores an auxiliary command indicating the unnecessity of waiting to receive a completion signal sent as a notification of the end of execution of the auxiliary command, and a condition for ending monitoring of a completion signal corresponding to an auxiliary command indicating the necessity of waiting to receive a completion signal sent as a notification of the end of execution of the auxiliary command. A reader 13 reads the machining programs stored in the machining program storage unit 12. A determination part 14 determines the presence of auxiliary commands in the machining programs read by the reader 13. When the determination part 14 confirms the presence of the auxiliary commands in the machining programs, an auxiliary command transmitter 15 transmits signals requesting to execute auxiliary functions associated with the auxiliary commands, to the external device 19 such as a programmable logic controller or a machine tool. A completion signal receiver 16 receives completion signals indicating the completion of the execution of the auxiliary functions. A completion signal monitoring part 18 monitors the completion signals until the condition for ending the monitoring of a completion signal is satisfied, the condition being stored in the auxiliary command storage unit 17.

An operator stores the machining programs in the machining program storage unit 12 beforehand. In general, each of the machining programs is configured by a block of an axis movement command for operating an axis and an auxiliary command block which is a block other than the block of axis movement command. In the auxiliary command storage unit 17, an auxiliary command for executing a subsequent command without waiting to receive the completion signal (i.e., "the auxiliary command indicating the unnecessity of waiting to receive a completion signal") and the condition for ending the monitoring of the completion signal are stored.

The condition for ending the monitoring of a completion signal is determined based on the number of execution blocks obtained after the execution of the auxiliary command stored in the auxiliary command storage unit 17 is started, the length of time elapsed since the start of the execution of the auxiliary command stored in the auxiliary command storage unit 17, a movement distance obtained after the start of the execution of the auxiliary command stored in the auxiliary command storage unit 17, and a machining position obtained after the execution of the auxiliary command stored in the auxiliary command storage unit 17.

In order to determine the condition for ending the monitoring of a completion signal, a counter for counting the number of execution blocks and a timer for measuring the elapsed time can be provided, and movement distance information can be acquired from position information obtained from a position detector detecting a position of a drive axis.

The reader 13 reads one of the machining programs from the machining program storage unit 12 and sequentially executes a program command. The determination part 14 determines whether or not the program command read by the reader 13 is the auxiliary command for executing a subsequent command without waiting to receive the completion signal (the auxiliary command indicating the unnecessity of waiting to receive the completion signal), which is stored in the auxiliary command storage unit 17. When the determination part 14 determines that the program command read by the reader 13 is the auxiliary command for executing a subsequent command without waiting to receive the completion signal, the auxiliary command transmitter 15 transmits a signal requesting to execute the auxiliary function associated with the auxiliary command.

When the determination part 14 determines that the program command read by the reader 13 is the auxiliary command for executing a subsequent command without waiting to receive the completion signal, the completion signal monitoring part 18 starts monitoring the completion signal. When the determination part 14 determines that the program command read by the reader 13 is the auxiliary command for executing a subsequent command without waiting to receive the completion signal (the auxiliary command indicating the unnecessity of waiting to receive the completion signal), the completion signal receiver 16 executes the subsequent command without waiting to receive the completion signal. The monitoring of the completion signal is continued, while subsequent commands are executed sequentially. When the completion signal receiver 16 receives the completion signal before the condition stored in the auxiliary command storage unit 17 is satisfied, the monitoring of the completion signal is ended.

The execution of the auxiliary command can allow the execution of a subsequent command without waiting to receive the completion signal, as well as reception of the completion signal. As a result, whether the auxiliary function is ended successfully or not can be determined. Even when the auxiliary function is not ended successfully, the numerical controller can perform machining efficiently by stopping the machining or issuing an alarm. The present configuration can achieve the same effects either way by using the external device 19 provided independently from the numerical controller 11 or an internal device mounted on the numerical controller 11.

Figure 2:
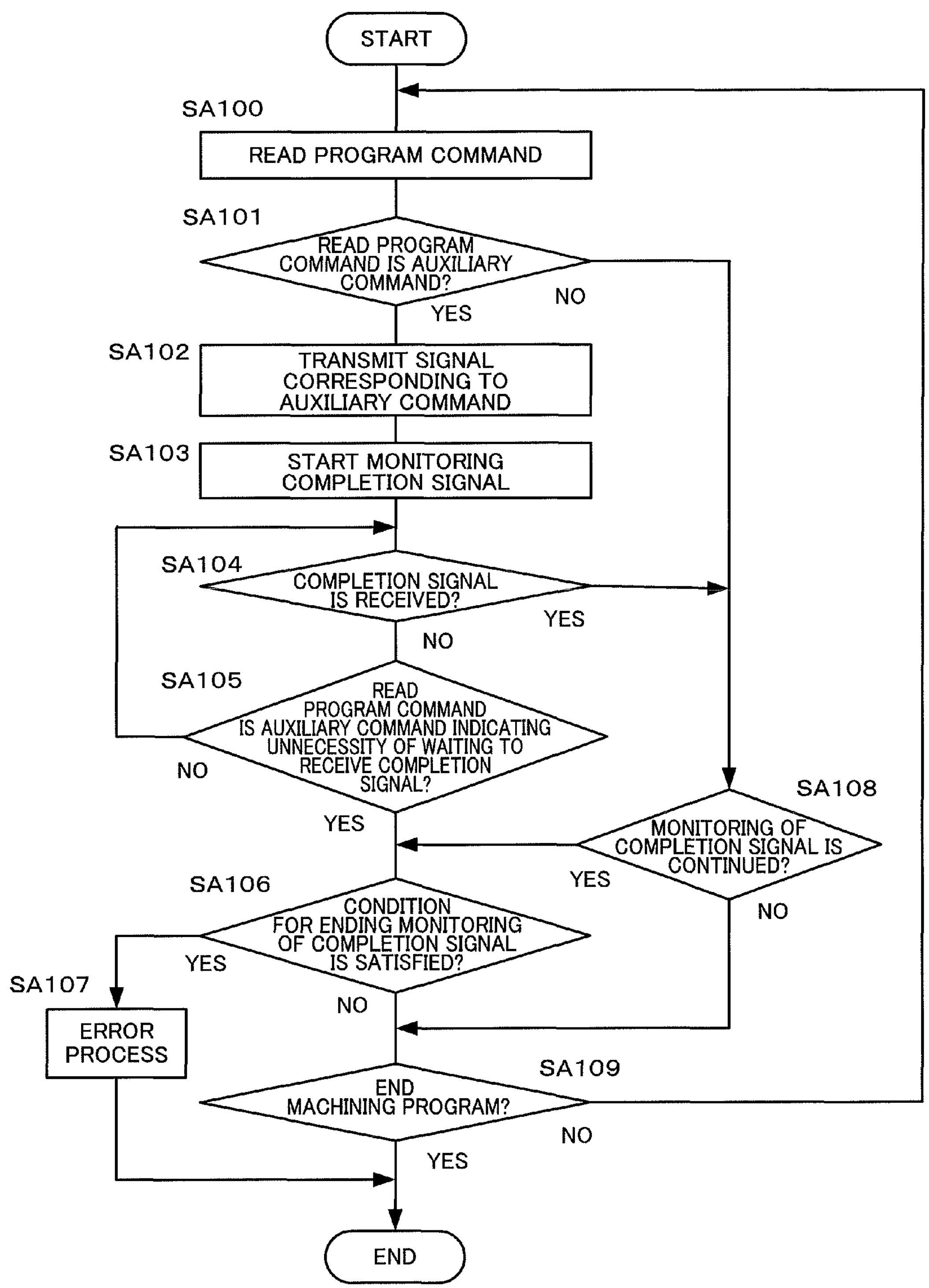
FIG. 2 is a flowchart for explaining an auxiliary command execution process performed by the numerical controller according to the present invention.
Figure 3:
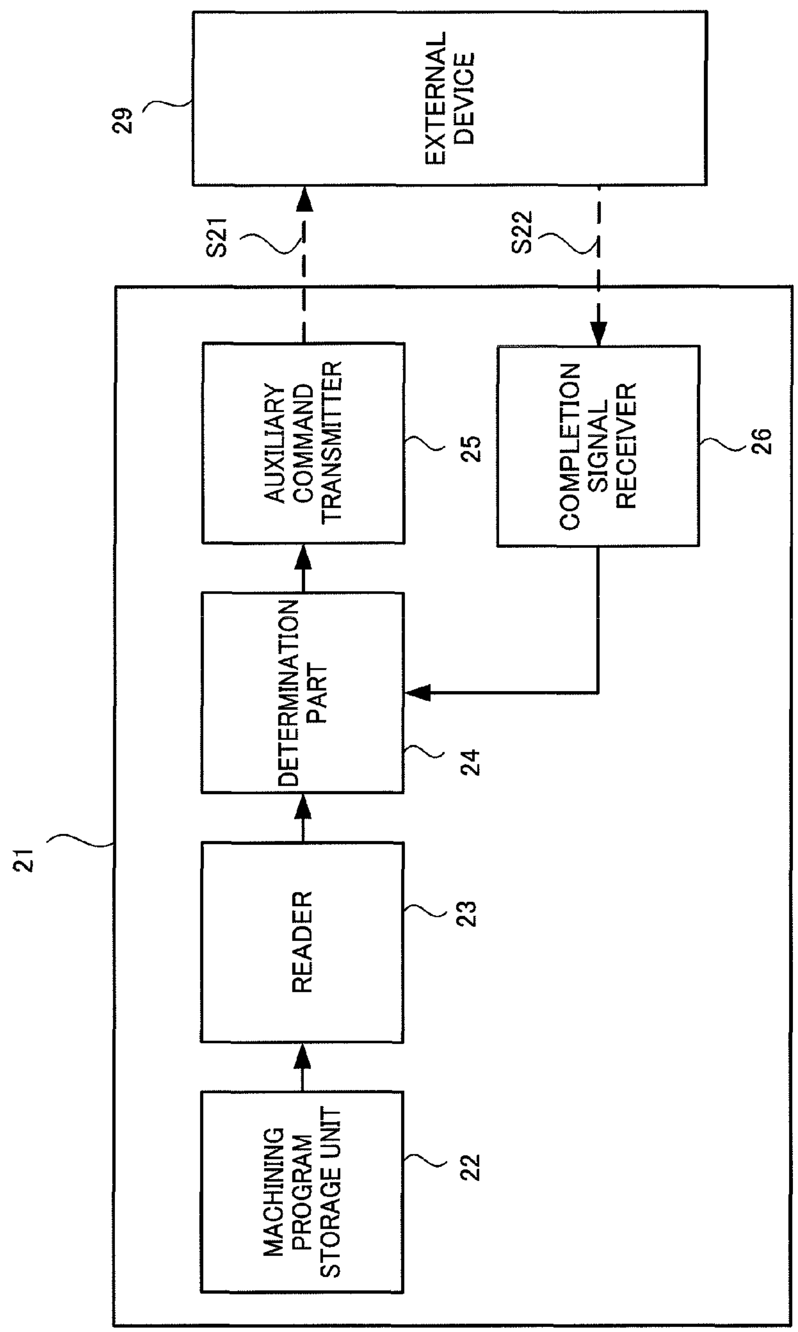
FIG. 3 is a diagram illustrating an M function output of a first example of a numerical controller according to a prior art.
Figure 4:
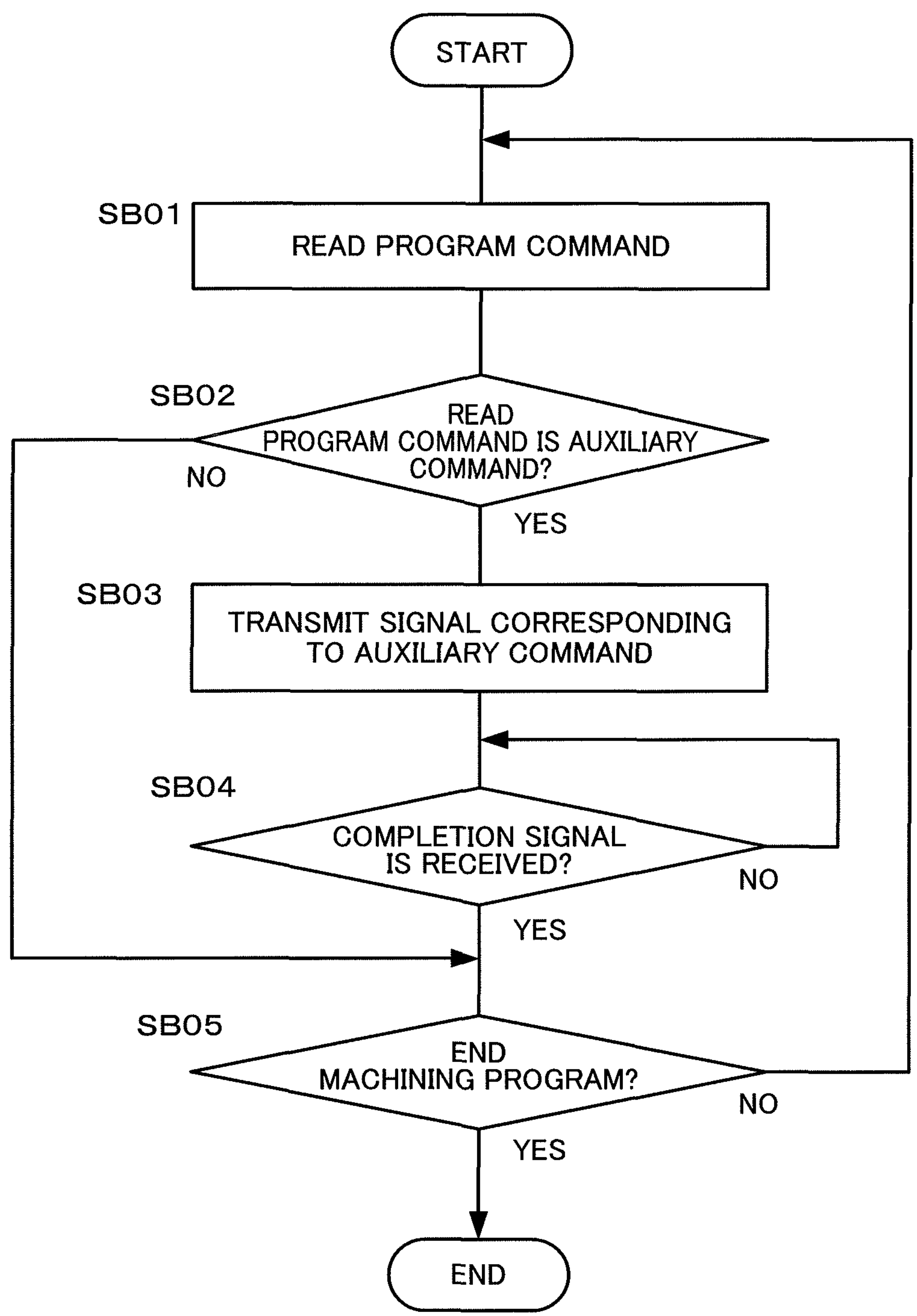
FIG. 4 is a flowchart for explaining an auxiliary command execution process performed by the numerical controller shown in FIG. 3.
Figure 5:
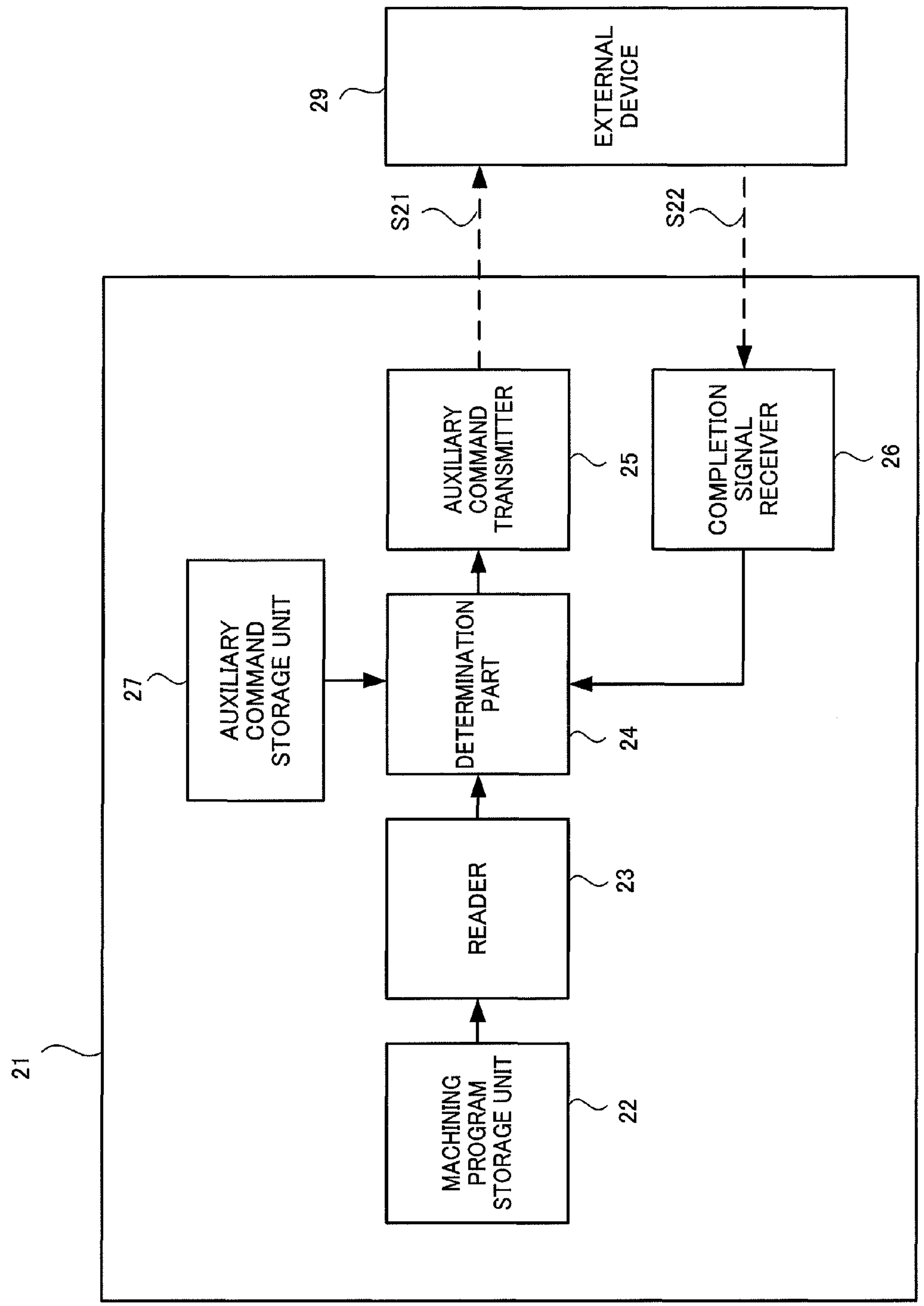
FIG. 5 is a diagram illustrating a second example of a numerical controller according to a prior art.
Figure 6:
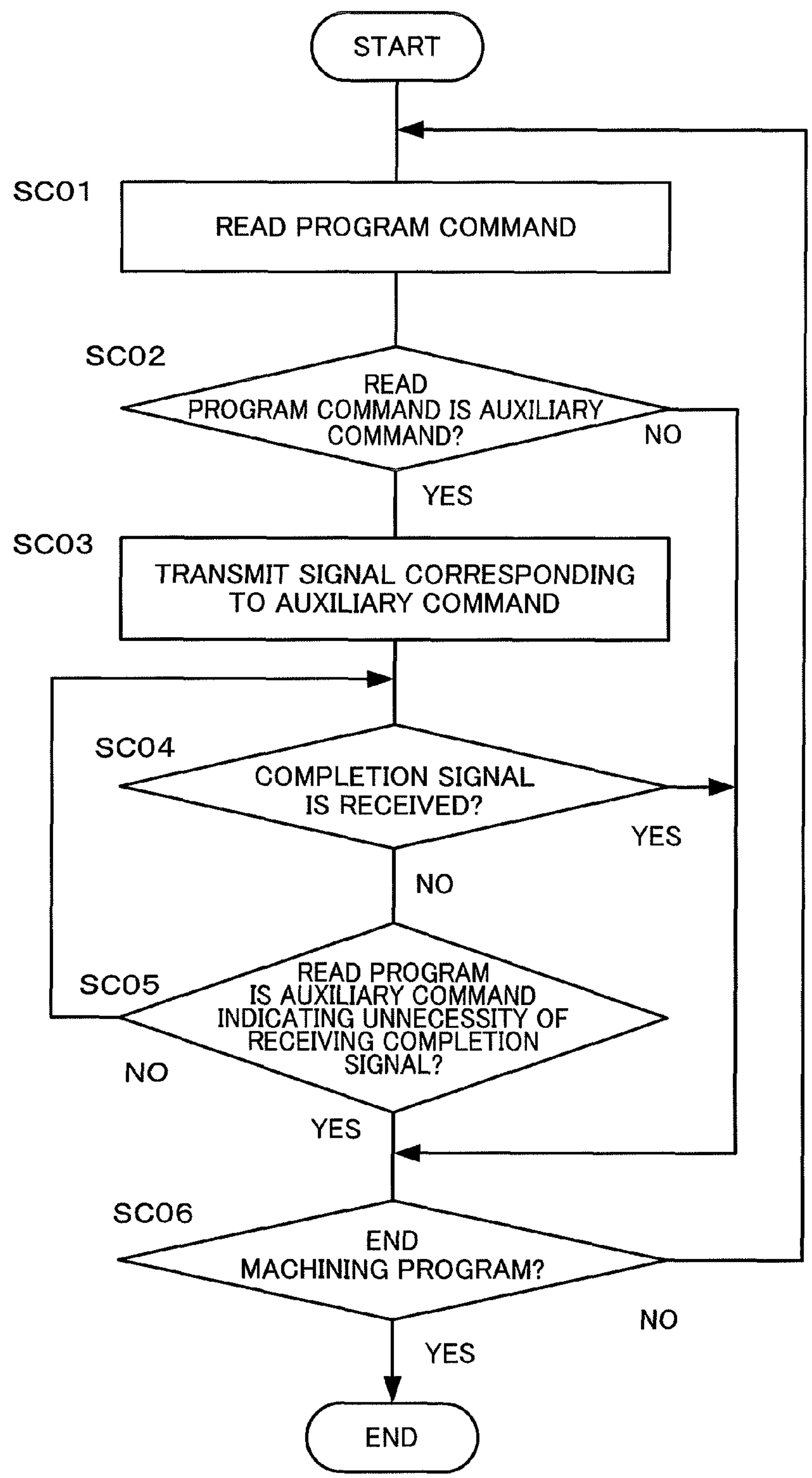
FIG. 6 is a flowchart for explaining an auxiliary command execution process performed by the numerical controller shown in FIG. 5.

An auxiliary command execution process performed by the numerical controller according to the present invention is described with reference to the flowchart shown in FIG. 2. Each of steps of the auxiliary command execution process is described hereinafter. Note that the flowchart shown in FIG. 2 relates to processing of an auxiliary command; thus, when the read program command is, for example, an axis movement command, a subsequent command is executed after the completion signal indicating the completion of the execution of the auxiliary command is received, or, when the program command is the auxiliary command stored in the auxiliary command storage unit 17, the subsequent command is executed without waiting to receive the completion signal indicating the completion of the execution of this auxiliary command.

[Step SA100] The program command of one of the machining programs is read.

[Step SA101] It is determined whether the read program command is an auxiliary command or not. When the read program command is an auxiliary command, the process proceeds to step SA102. When the read program command is not an auxiliary command, the process proceeds to step SA108.

[Step SA102] A signal corresponding to the auxiliary command is transmitted.

[Step SA103] Monitoring of the completion signal is started.

[Step SA104] It is determined whether the completion signal is received or not. When the completion signal is received, the process proceeds to step SA108. When the completion signal is not received, the process proceeds to step SA105.

[Step SA105] It is determined whether or not the auxiliary command, which is the read program command, is the command indicating the unnecessity of waiting to receive the completion signal. When the auxiliary command is the auxiliary command indicating the unnecessity of waiting to receive the completion signal, the process proceeds to step SA106. When the auxiliary command is the auxiliary command indicating the necessity of waiting to receive the completion signal, the process returns to step SA104.

[Step SA106] It is determined whether the condition for ending the monitoring the completion signal corresponding to the auxiliary command (indicating the unnecessity of waiting to receive the completion signal) is satisfied or not. When the condition is satisfied, the process proceeds to step SA107. When the condition is not satisfied, the process proceeds to step SA109.

[Step SA107] The process is ended by stopping the machining program or executing an error process by issuing an alarm or the like.

[Step SA108] It is determined whether the monitoring of the completion signal is continued or not. When the monitoring of the completion signal is continued, the process proceeds to step SA106. When the monitoring of the completion signal is not continued, the process proceeds to step SA109. Whether the monitoring of the completion signal is continued or not can be determined by using, for example, the counter for counting the number of execution blocks obtained after the execution of the auxiliary command is started, the timer for measuring the length of time elapsed since the start of the execution of the auxiliary command, or the movement distance information obtained after the execution of the auxiliary command is started.

[Step SA109] It is determined whether the machining program is ended or not. When the machining program is ended, the process is ended. When the machining program is not ended, the process returns to step SA100 so that the process is continued.

Note that the present process can be satisfied separately from the process of monitoring the completion signal.

What is claimed is:

1. A numerical controller which, when reading a program command from a machining program, determines whether the read program command is an auxiliary command or not, transmits a signal requesting to execute an auxiliary function associated with the auxiliary command when the read program command is the auxiliary command, and executes a subsequent command by receiving a signal indicating the completion of the auxiliary command, the numerical controller comprising:

a storage unit for storing an auxiliary command indicating unnecessity of waiting to receive a completion signal corresponding to an auxiliary command, and a condition for ending monitoring of the completion signal corresponding to the auxiliary command, wherein, after starting the execution of the auxiliary command indicating the unnecessity of waiting to receive the completion signal, monitoring of the completion signal corresponding to the auxiliary command is started and the monitoring of the completion signal is continued while subsequent commands are sequentially executed, and wherein when the completion signal is received before the condition for ending monitoring of the completion signal, stored in the storage unit, is satisfied, the monitoring of the completion signal is ended, but when the completion signal corresponding to the auxiliary command is not received before the condition for ending monitoring of the completion signal is satisfied, the execution of the machining program is stopped.

2. The numerical controller according to claim 1, wherein the condition for ending monitoring of the completion signal, which is stored in the storage unit, is the number of execution blocks obtained after the execution of the auxiliary command stored in the storage unit is started.

3. The numerical controller according to claim 2, wherein when the completion signal corresponding to the auxiliary command is not received, an alarm is issued.

4. The numerical controller according to claim 1, wherein the condition for ending monitoring of the completion signal, which is stored in the storage unit, is a length of time elapsed since the start of the execution of the auxiliary command stored in the storage unit.

5. The numerical controller according to claim 4, wherein when the completion signal corresponding to the auxiliary command is not received, an alarm is issued.

6. The numerical controller according to claim 1, wherein the condition for ending monitoring of the completion signal, which is stored in the storage unit, is a movement distance obtained after the start of the execution of the auxiliary command stored in the storage unit.

7. The numerical controller according to claim 6, wherein when the completion signal corresponding to the auxiliary command is not received, an alarm is issued.

8. The numerical controller according to claim 1, wherein the condition for ending monitoring of the completion signal, which is stored in the storage unit, is a machining position obtained after the start of the execution of the auxiliary command stored in the storage unit.

9. The numerical controller according to claim 8, wherein when the completion signal corresponding to the auxiliary command is not received, an alarm is issued.

10. The numerical controller according to claim 1, wherein when the completion signal corresponding to the auxiliary command is not received, an alarm is issued.

* * * * *